(12) United States Patent
Zhang et al.

(10) Patent No.: US 11,741,107 B2
(45) Date of Patent: Aug. 29, 2023

(54) TRAVEL ASSISTING METHOD AND TERMINAL

(71) Applicant: Huawei Device Co., Ltd., Dongguan (CN)

(72) Inventors: Ting Zhang, Shenzhen (CN); Hongjun Wang, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 658 days.

(21) Appl. No.: 16/002,101

(22) Filed: Jun. 7, 2018

(65) Prior Publication Data

US 2018/0336251 A1 Nov. 22, 2018

Related U.S. Application Data

(63) Continuation of application No. 14/143,486, filed on Dec. 30, 2013, now abandoned, which is a (Continued)

(51) Int. Cl.
*G06F 16/2457* (2019.01)
*G06Q 10/10* (2023.01)
(Continued)

(52) U.S. Cl.
CPC ..... *G06F 16/24575* (2019.01); *G01C 21/343* (2013.01); *G01C 21/362* (2013.01); *G06Q 10/10* (2013.01); *G06Q 50/12* (2013.01)

(58) Field of Classification Search
CPC .. G06F 16/9535; G06F 3/0325; G06F 16/951; G06F 21/35; G06F 16/24575;
(Continued)

(56) References Cited

U.S. PATENT DOCUMENTS

| 5,790,974 A | 8/1998 | Tognazzini |
| 5,842,009 A | 11/1998 | Borovoy et al. |

(Continued)

FOREIGN PATENT DOCUMENTS

| CN | 1753003 A | 3/2006 |
| CN | 101645059 A | 2/2010 |

(Continued)

*Primary Examiner* — Mariela Reyes
*Assistant Examiner* — Courtney Harmon
(74) *Attorney, Agent, or Firm* — Leydig, Voit & Mayer, Ltd.

(57) ABSTRACT

An embodiment of the present invention discloses a travel assisting method, including: extracting trip information from content saved in a terminal and saving the extracted trip information in a trip list; selecting the trip information from the trip list, automatically connecting to a preset network address or a preset server address, and searching by using part or all of content of each piece of the selected trip information as a key word, so as to obtain assisting information corresponding to the trip information; and generating prompting information. Correspondingly, an embodiment of the present invention further discloses a terminal. The present invention enables the terminal to automatically provide effective reference information for a user according to a trip of the user, solving the problem that an operation is troublesome and time-consuming when the user obtains trip-related assisting information by using the terminal.

15 Claims, 5 Drawing Sheets

Related U.S. Application Data continuation of application No. PCT/CN2011/078160, filed on Aug. 9, 2011.

(51) Int. Cl.
*G01C 21/34* (2006.01)
*G01C 21/36* (2006.01)
*G06Q 50/12* (2012.01)

(58) Field of Classification Search
CPC .... G01C 21/343; G01C 21/362; G06Q 10/10; G06Q 50/12
See application file for complete search history.

(56) References Cited

U.S. PATENT DOCUMENTS

| | | | |
|---|---|---|---|
| 7,584,253 | B2 | 9/2009 | Curbow et al. |
| 7,685,199 | B2 | 3/2010 | Chandrasekar et al. |
| 8,825,362 | B2 | 9/2014 | Kirsch |
| 9,002,725 | B1 * | 4/2015 | Carobus ............... G06Q 10/107 705/14.54 |
| 2003/0055689 | A1 | 3/2003 | Block et al. |
| 2006/0047635 | A1 | 3/2006 | Kraenzel et al. |
| 2007/0011034 | A1 | 1/2007 | Jones et al. |
| 2007/0266008 | A1 | 11/2007 | Bae et al. |
| 2008/0109370 | A1 * | 5/2008 | Moshir ............... G06Q 30/06 705/64 |
| 2008/0167973 | A1 | 7/2008 | De Marcken |
| 2008/0307046 | A1 | 12/2008 | Baek et al. |
| 2009/0029674 | A1 | 1/2009 | Matthew et al. |
| 2009/0150514 | A1 | 6/2009 | Davis et al. |
| 2009/0210262 | A1 * | 8/2009 | Rines .................... G06Q 10/06 705/5 |
| 2009/0291672 | A1 | 11/2009 | Treves et al. |
| 2010/0094529 | A1 | 4/2010 | Gupta et al. |
| 2010/0228577 | A1 | 9/2010 | Cunningham et al. |
| 2011/0125545 | A1 | 5/2011 | Lehmann et al. |
| 2011/0130958 | A1 | 6/2011 | Stahl et al. |
| 2011/0225257 | A1 * | 9/2011 | Tilden ................. G06F 16/9535 709/207 |
| 2011/0288768 | A1 * | 11/2011 | Stefani ................... G06Q 90/20 701/533 |
| 2011/0301835 | A1 | 12/2011 | Bongiorno |
| 2013/0151291 | A1 | 6/2013 | Salway |
| 2015/0161526 | A1 | 6/2015 | Yalcin et al. |
| 2015/0161528 | A1 | 6/2015 | Yalcin et al. |

FOREIGN PATENT DOCUMENTS

| | | |
|---|---|---|
| CN | 101917678 A | 12/2010 |
| CN | 102131165 A | 7/2011 |
| WO | 2006111411 A1 | 10/2006 |
| WO | 2010086620 A1 | 8/2010 |

* cited by examiner

TRAVEL ASSISTING METHOD AND TERMINAL

CROSS-REFERENCE TO RELATED APPLICATIONS

This application is a continuation of U.S. patent application Ser. No. 14/143,486, filed on Dec. 30, 2013, which is a continuation of International Application No. PCT/CN2011/078160, filed on Aug. 9, 2011, which are hereby incorporated by reference in their entireties.

TECHNICAL FIELD

Embodiments of the present invention relate to the field of terminal technologies, and in particular, to a travel assisting method and terminal.

BACKGROUND

A terminal, especially a mobile terminal such as a mobile phone, a personal access system, or a PDA (Personal Digital Assistant, personal digital assistant), is becoming indispensable in people's daily life, and requirements of people for functions of the mobile terminal are increasing. For example, an existing mobile terminal provides a weather forecast function, a user may appoint a certain location, and the mobile terminal may obtain weather information of the appointed location from a weather information website and report the weather information of the appointed location to the user regularly. Although the weather forecast function is capable of meeting demands of average users to a certain extent, for business persons who are on business trips frequently, because destinations of the business trips frequently change, if a user wants to obtain weather information of the destinations of the business trips, the user needs to manually change destinations frequently. For another example, the existing mobile terminal is installed with some intelligent applications, and users may manually query domestic flight information through these intelligent applications or log in to an appointed flight information website to query flight information related to the trips. To sum up, although the prior art provides a plurality of manners for the users, the acquisition of information (such as assisting information related to trips of the users, including flight information, weather information of a destination, and the like) requires manual operation of the users and is troublesome and time-consuming.

SUMMARY

Embodiments of the present disclosure provide a travel assisting method and terminal, which are capable of solving the problem that an operation is troublesome and time-consuming when a user obtains assisting information related to the trip by using a terminal.

In one aspect, an embodiment of the present invention provides a travel assisting method, including:

extracting trip information from content saved in a terminal and saving the extracted trip information in a trip list, where the trip information is travel-related information and the trip list is used to save the trip information;

selecting the trip information from the trip list, automatically connecting to a preset network address or a preset server address, and searching by using part or all of content of each piece of the selected trip information as a key word, so as to obtain assisting information corresponding to the trip information; and generating prompting information which includes the trip information and the assisting information corresponding to the trip information.

In the other aspect, an embodiment of the present invention further provides a terminal, including:

an extracting module, configured to extract trip information from content saved in the terminal, where the trip information is travel-related information;

a saving module, configured to save the trip information extracted by the extracting module in a trip list, where the trip list is used to save the trip information;

a searching module, configured to select the trip information from the trip list, automatically connect to a preset network address or a preset server address, and search by using part or all of content of each piece of the selected trip information as a key word, so as to obtain assisting information corresponding to the trip information; and a prompting module, configured to generate prompting information which includes the trip information and the assisting information corresponding to the trip information.

Implementation of the embodiments of the present invention has the following beneficial effects.

According to the embodiments of the present invention, a terminal extracts trip information from content saved in it, automatically connects to a preset network address or a preset server address, and searches for assisting information corresponding to the trip information by using part or all of content of the trip information as a key word, and generates prompting information to a user. Therefore, the user is capable of conveniently and quickly obtaining firsthand travel assisting information, saving troubles brought by manual participation of the user and therefore solving the problem that an operation is troublesome and time-consuming when the user obtains effective trip-related information by using the terminal.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
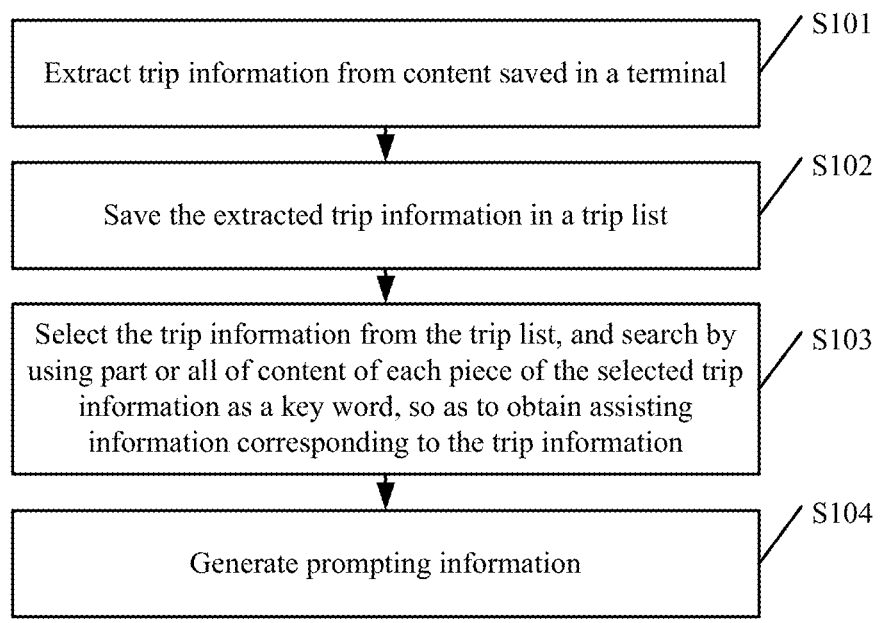
FIG. 1 is a flowchart of an embodiment of a travel assisting method according to the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the solutions provided by the embodiments of the present invention, a terminal extracts trip information from content saved in it, automatically connects to a preset network address or a preset server address, and searches for assisting information corresponding to the trip information by using part or all of content of the trip information as a key word, and generates prompting information.

The content saved in the terminal may include content saved in a storage space corresponding to any or more of the following applications: Calendar (Calendar), Events (Events), Memo (Memo), Email (Email), multimedia message (multimedia message, MMS), and short message (short message). The content saved in the terminal may further include: content saved in various types of expansion cards connected to the terminal, such as content saved in an expansion card such as a TF (Trans Flash, a type of card) card or an SD (Secure Digital Memory Card, secure digital memory card).

The trip information is travel-related information and the trip information records information related to a trip of a user, such as a city to be travelled, a flight or train to be taken, set-off time, and the like. In a practical application, the trip information may be information including time and a flight, for example, a piece of trip information may be expressed as: Monday morning 9:30, flight NF3324; the trip information may also be information including time and a train, for example, a piece of trip information may be expressed as: 12:30, May 10, train K386; the trip information may also be information including time, a location, and a flight, for example, a piece of trip information may be expressed as: 19:35, March 23, flight NF24, Tokyo; and the trip information may also be information including time, a location, and a train, for example, a piece of trip information may be expressed as: 14:00, March 10, train K386, Guangzhou.

The assisting information corresponding to the trip information is travel reference information related to the trip information, including: weather information of the city where the user is going to travel, a detailed introduction to the flight or train to be taken by the user, and the like. In a practical application, the assisting information may be: weather information, takeoff time of the flight, introduction information of the flight, arriving time of the flight, delay information of the flight, departure time of the train, arriving time of the train, introduction information of the train, delay information of the train, and the like.

The prompting information may include the trip information and the assisting information corresponding to the trip information. For example, a piece of prompting information may be expressed as: "14:00, March 10, train K386, Guangzhou; the departure time of the train for you to take is 14:00, March 10, the arriving time is 9:00, March 12, and the destination is Guangzhou; and the highest temperature is 11° C. and the lowest temperature is 8° C. in Guangzhou on March 12!". In a practical application, the prompting information may only include the assisting information corresponding to the trip information. For example, a piece of prompting information may be expressed as: "The departure time of the train, number K386, for you to take is 14:00, March 10, the arriving time is 9:00, March 12, and the destination is Guangzhou; and the highest temperature is 11° C. and the lowest temperature is 8° C. in Guangzhou on March 12!". The prompting information may further include some prompting words. For example, the foregoing prompting information may further include "The weather is cold. Please take warm clothes!". These prompting words may be saved in the terminal in advance, and when the prompting information is generated, the prompting words are directly invoked for generating the prompting information.

A travel assisting method according to the embodiments of the present invention is described in detail in the following with reference to FIG. 1 to FIG. 4.

Refer to FIG. 1, which is a flowchart of an embodiment of a travel assisting method according to the present invention. The method includes the following.

S101: Extract trip information from content saved in a terminal.

In step S101, the trip information is extracted from the content saved in the terminal, where the extracting operation may be performed when the terminal is powered on and started, the extracting operation belongs to a background operation, the extracted trip information may be cached in the terminal, and when the travel assisting function of the terminal is started, the extracted trip information is provided for a subsequent process to invoke; and the extracting operation may also be performed after the terminal is powered on and started, and when the travel assisting function of the terminal is started, the trip information is extracted in real time from the content saved in the terminal. The extracting operation may also be performed at a certain frequency, and the extracting operation may also be performed during saving of the content in the terminal. For example, after the terminal is powered on and started, the trip information is extracted from the content saved in the terminal regularly; or when the travel assisting function of the terminal is started, the trip information is extracted from the content saved in the terminal regularly; or the trip information is extracted when a received short message is saved in the terminal, and the like.

In step S101, the trip information is extracted according to a certain rule. The rule may be one or a combination of more of the following: information including current time, information including time after the current time, information including a location, information including a flight, and information including a train. The current time is system time of the terminal when step S101 is executed.

If the rule is: information including current time, in step S101, the content saved in the terminal is traversed and it is checked whether the information including current time exists. For example, when the current time is 13:00, May 20, 2011, it is checked whether the content saved in the terminal includes information of a time parameter "2011-5-20, 13:00". If the rule is: information including time after the current time, in step S101, the content saved in the terminal is traversed and it is checked whether the information including time after the current time exists. As in the foregoing example, it is checked whether the content saved in the terminal includes information of a time parameter later than "2011-5-20, 13:00". If the rule is: information including a location, in step S101, the content saved in the terminal is traversed and it is checked whether the information including a location exists. If the rule is: information including a flight, in step S101, the content saved in the terminal is traversed and it is checked whether the information including a flight exists. If the rule is: information including a train, in step S101, the content saved in the terminal is traversed and it is checked whether the information including a train exists. If the rule is a combination of the foregoing rules, in step S101, the content saved in the terminal is traversed and it is checked whether information synchronously including combined rules exists. For example, if the rule is: a rule combination of the information including current time and the information including a location, in step S101, the content saved in the terminal is traversed and it is checked whether information synchronously including the current time and the location exists. It should be understood that when the rule is another combination, similar analysis is performed and is not described herein again.

In a practical application, various types of characteristic information may be saved in the terminal in advance, such as various expression forms of current time (for example: a time stamp, xx year xx month xx day, morning, afternoon, am, pm, XX:XX, and the like), various expression forms of a location (for example: Shenzhen, shengzhen, SZ, Tokyo, and the like), various expression forms of a flight (for example: Flight, NF, and the like), and various expression forms of a train (for example: K386, K1912, 265, and the like). Based on various types of characteristic information saved in the terminal, information in the content saved in the terminal, which matches the various types of characteristic information is identified, and it is determined whether the information meets an extracting rule. If yes, the information is extracted as the trip information.

It should be noted that, after extracting the trip information from the content saved in the terminal, the trip information that has been extracted from the content saved in the terminal may be marked, so that when the extracting operation is performed again, the marked content may be ignored. Marking the content that has been extracted can improve the efficiency of the extracting operation.

S102: Save the extracted trip information in a trip list.

In step S102, the trip information extracted in step S101 may be saved in the trip list, where the trip list is used to save the extracted trip information. Adopting the trip list to save the extracted trip information can facilitate management on the trip information. It should be understood that, the extracted trip information may not be saved in the trip list. In this case, the time in the trip information may be compared with the current system time, and if the time in the trip information meets a certain condition, a searching step is executed.

S103: Select the trip information from the trip list, automatically connect to a preset network address or a preset server address, and search by using part or all of content of each piece of the selected trip information as a key word, so as to obtain assisting information corresponding to the trip information.

The terminal may be preset with some network addresses or server addresses, for example, a website or a server address of a weather information querying site is preset, a website or a server address of an airline company site is preset, or a website or a server address of a train/bus querying site is preset. In step S103, the trip information is selected from the trip list, part or all of content of each piece of the selected trip information is used as a key word, and the preset network address or the preset server address in the terminal is automatically connected to search, so as to obtain the assisting information corresponding to the selected trip information. Searching based on the preset network address or the preset server address can greatly improve searching speed.

S104: Generate prompting information.

In step S104, the generated prompting information may adopt a display screen of the terminal to timely display the assisting information to a user, so that the user can conveniently and quickly perform effective query and reference for a trip, or may adopt a sound output device of the terminal to broadcast the assisting information to the user in a sound manner, so that the user can conveniently and quickly perform effective query and reference for the trip.

Figure 2:
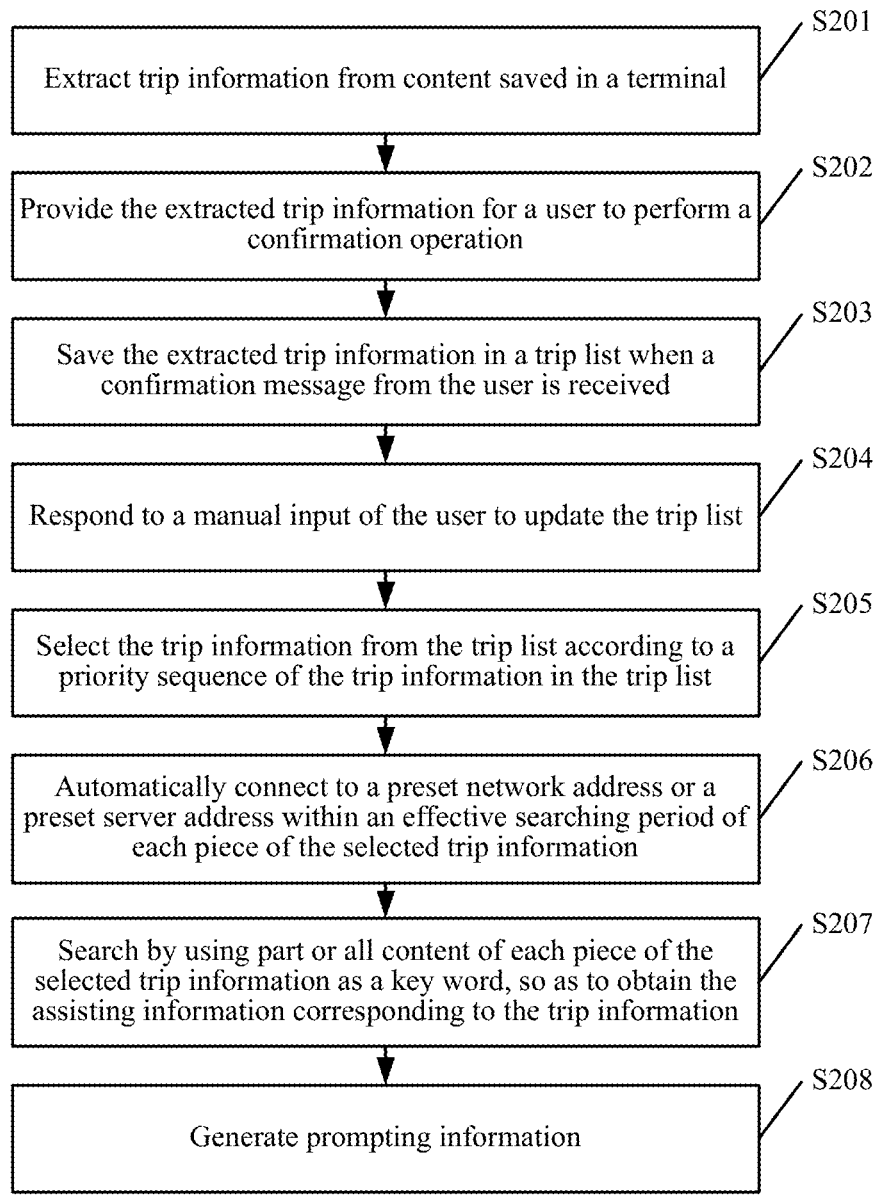
FIG. 2 is a flowchart of another embodiment of a travel assisting method according to the present invention.

Refer to FIG. 2, which is a flowchart of another embodiment of a travel assisting method according to the present invention. The method includes the following.

S201: Extract trip information from content saved in a terminal.

For step S201 in this embodiment, reference may be made to step S101 according to the embodiment shown in FIG. 1, and details will not be provided herein.

S202: Provide the extracted trip information for a user to perform a confirmation operation.

The trip information extracted in step S201 needs the user to confirm the effectiveness thereof. In step S202, the extracted trip information is provided for the user to perform the confirmation operation. In this case, the terminal may provide a man-machine interactive interface (such as a display screen, a touchscreen, and the like) to display the extracted trip information to the user and receive the confirmation operation of the user on the displayed trip information. For a certain piece of trip information, the trip information is effective trip information if a confirmation message from the user is received. If a denial message from the user is received, the trip information is ineffective trip information.

S203: Save the extracted trip information in a trip list when a confirmation message from the user is received.

If the confirmation message from the user is received, it indicates that the trip information corresponding to the confirmation message is effective trip information and the trip information is saved in the trip list in step S203. It should be understood that, if the denial message from the user is received, it indicates that the trip information corresponding to the denial message is ineffective trip information, and the terminal ignores the trip information without performing any processing on the ineffective trip information. If neither the confirmation message from the user nor the denial message from the user is received in preset time, the trip information to be confirmed may be saved in the trip list and the user is prompted of new trip information. In addition, the trip information has been saved in the trip list, and the user may confirm the new trip information in the trip list.

Optionally, S204: Respond to a manual input of the user to update the trip list.

The user may perform manual input on the trip list. The manual input may include: editing the trip information in the trip list, deleting the trip information from the trip list, sequencing the trip information in the trip list according to a priority, creating new trip information in the trip list, and the like, and may further include a confirmation operation on the trip information to be confirmed in the trip list.

Figure 3:
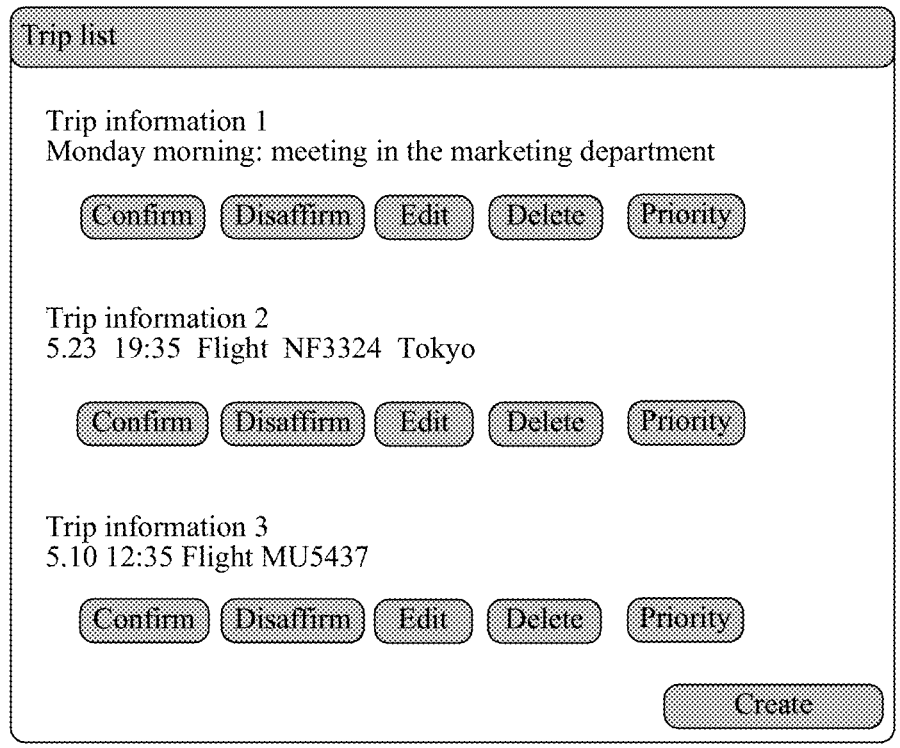
FIG. 3 is a schematic diagram of a trip list according to an embodiment of the present invention.

Reference may be made to FIG. 3, which is a schematic diagram of a trip list according to an embodiment of the present invention. When the terminal provides the trip list for the user, the terminal further provides operation interfaces in the trip list, including an edit key, a delete key, a priority set key, and a create key, and further provides a confirm key. The user may perform manual input in the trip list through each operation interface.

Figure 4:
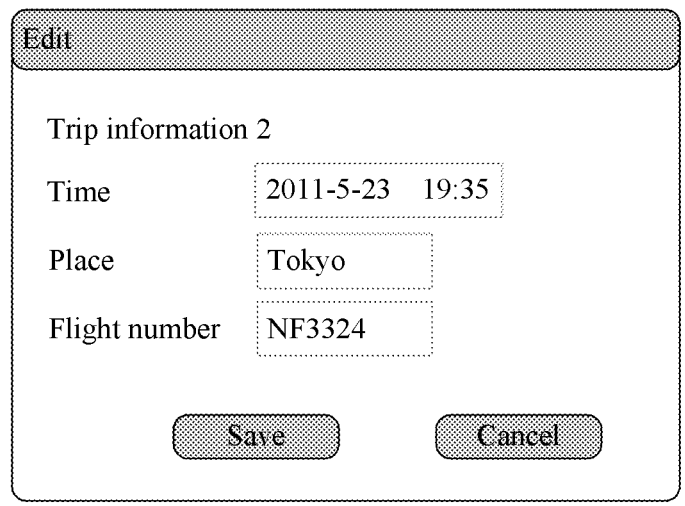
FIG. 4 is a schematic diagram of editing a trip list according to an embodiment of the present invention.

Refer to FIG. 4, which is a schematic diagram of editing a trip list according to an embodiment of the present invention. When the user clicks the "edit" key shown in FIG. 3, the terminal may display an "edit interface" shown in FIG. 4 for the user, and the user may modify corresponding trip information and save it on this edit interface. When the user clicks the "create" key shown in FIG. 3, the terminal may also display the "edit interface" shown in FIG. 4 for the user, and the user may edit new trip information and save it on this edit interface. When the user clicks the "delete" key shown in FIG. 3, the trip information is deleted from the trip list. When the user clicks the "priority" key shown in FIG. 3, the trip information corresponding to the "priority" key is sequenced preferentially and is arranged at the top of the trip list, and the user may complete the priority sequencing of the trip information in the trip list through the "priority" operation on the trip information in the trip list. When the user clicks the "confirm" key shown in FIG. 3, the terminal receives a confirmation message from the user on the trip information; and when the user clicks the "deny" key shown in FIG. 3, the terminal receives a denial message from the user on the trip information.

It should be noted that, the foregoing manual input of the user in a manner of pressing a key is only an example, and the manual input may also adopt other manners. For example, if the terminal is a touchscreen terminal, the user is capable of directly performing priority sequencing on the trip information in a dragging manner without pressing the "priority" key, and the like.

Optionally, in step S204, the terminal responds to the manual input of the user and updates the trip list according to the manual input of the user.

Optionally, S205: Select the trip information from the trip list according to a priority sequence of the trip information in the trip list.

S206: Automatically connect to a preset network address or a preset server address within an effective searching period of each piece of the selected trip information.

Each piece of the trip information has a corresponding effective searching period, and assisting information obtained within the effective searching period may provide effective travel references for the user. If the trip information includes a flight or a train, the effective searching period of the trip information may be: from a moment when the confirmation message from the user is received to takeoff time of the flight, or from a moment when the confirmation message from the user is received to departure time of the train. If the trip information includes a location, the effective searching period of the trip information may be: from a moment when the confirmation message from the user is received to a moment when the user leaves the location. The trip information in the trip list is arranged according to a certain sequence. This sequence may be a default arranging sequence in the trip list, may be an arranging sequence formed after the manual input of the user, may be a time sequence that each piece of the trip information is saved in the trip list, or may be a time sequence of a starting point of the effective searching period of each piece of the trip information, and the like. In step S205 to step S206, the terminal may select the trip information from the trip list according to the priority sequence of the trip information in the trip list and automatically connect to the preset network address or the preset server address at certain time points within the effective searching period of the selected trip information. It should be understood that, in step S205 to step S206, the terminal may trigger trip information selection according to various types of conditions, for example, trigger according to a searching command sent by the user. If receiving the searching command sent by the user, the terminal is triggered by the searching command to immediately select the trip information (the selected trip must be an effective trip, that is, system time when the trip is selected falls within an effective searching period range of the selected trip), and automatically connect to the preset network address or the preset server address. The terminal may also preset a start time point of the searching command, start the trip information selection when the instructed time point arrives (the selected trip must be an effective trip, that is, system time when the trip is the selected falls within the effective searching period range of the selected trip), and automatically connect to the preset network address or the preset server address. Besides, the terminal may also set one or more searching time points for each trip in the terminal, and when the searching time point arrives, the terminal uses the trip as the selected trip and automatically connects to the preset network address or the preset server address.

In step S206, the preset network address or the preset server address may include: a preset website or server address of a weather information querying site, a preset website or server address of an airline company site, a preset website or server address of a train/bus querying site, and the like.

S207: Search by using part or all of content of each piece of the selected trip information as a key word, so as to obtain assisting information corresponding to the trip information.

In step S207, searching is performed by using part or all of content of each piece of the selected trip information as a key word, so as to obtain the assisting information corresponding to the trip information, where if the trip information is information including time and a location, the key words may be the time and the location, and the obtained assisting information may include weather information of the location; if the trip information is information including time and a flight, the key words may be the time and the flight, and the obtained assisting information may include one or more of the following: takeoff time of the flight, arriving time of the flight, delay information of the flight, and introduction information of the flight; if the trip information is information including time and a train, the key words may be the time and the train, and the obtained assisting information may include one or more of the following: departure time of the train, arriving time of the train, delay information of the train, and introduction information of the train; if the trip information is information including time, a location, and a flight, the key words may be the time, the location, and the flight, and the obtained assisting information may include one or more of the following: takeoff time of the flight, arriving time of the flight, delay information of the flight, and introduction information of the flight, in combination with weather information of the location; and if the trip information is information including time, a location, and a train, the key words may be the time, the location, and the train, and the obtained assisting information may include one or more of the following: departure time of the train, arriving time of the train, delay information of the train, and introduction information of the train, in combination with the weather information of the location.

S208: Generate prompting information.

For step S208 in this embodiment, reference may be made to step S104 shown in FIG. 1, and details will not be provided herein.

According to the embodiments of the present invention, a terminal extracts trip information from content saved in it, automatically connects to a preset network address or a preset server address, and searches for assisting information corresponding to the trip information by using part or all of content of the trip information as a key word, and generates prompting information to a user. Therefore, the user is capable of conveniently and quickly obtaining firsthand travel assisting information, saving troubles brought by manual participation of the user and therefore solving the problem that an operation is troublesome and time-consuming when the user obtains effective trip-related information by using the terminal.

Corresponding to any one of the travel assisting methods shown in FIG. 1 to FIG. 4, a terminal according to the embodiments of the present invention is described in detail in the following with reference to FIG. 5 to FIG. 8. The terminal may be applied to the travel assisting method according to the foregoing embodiments.

Figure 5:
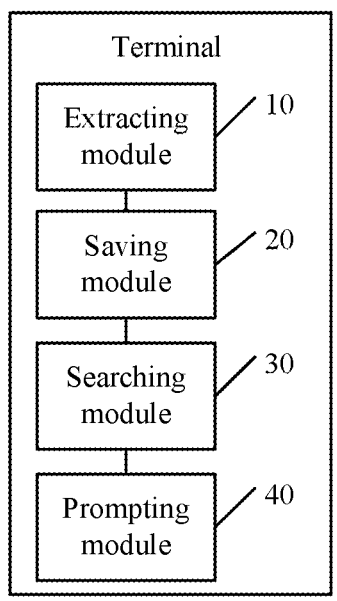
FIG. 5 is a schematic structural diagram of an embodiment of a terminal according to the present invention.

Refer to FIG. 5, which is a schematic structural diagram of an embodiment of a terminal according to the present invention. The terminal includes the following.

An extracting module 10 is configured to extract trip information from content saved in a terminal, where the trip information is travel-related information.

The extracting operation of the extracting module 10 may be performed when the terminal is powered on and started, the extracting operation belongs to a background operation, and the extracted trip information may be cached in the terminal, and when the travel assisting function of the terminal is started, the extracted trip information is provided for a subsequent process to invoke; and the extracting operation may also happen after the terminal is powered on and started, and when the travel assisting function of the terminal is started, the trip information is extracted in real time from the content saved in the terminal. The extracting operation may also be performed at a certain frequency, and the extracting operation may also be performed during saving of the content in the terminal. For example, after the terminal is powered on and started, the trip information is extracted from the content saved in the terminal regularly; or when the travel assisting function of the terminal is started, the trip information is extracted from the content saved in the terminal regularly; or the trip information is extracted when a received short message is saved in the terminal, and the like.

In a practical application, various types of characteristic information may be saved in the terminal in advance, such as various expression forms of current time (for example: a time stamp, xx year xx month xx day, morning, afternoon, am, pm, XX:XX, and the like), various expression forms of a location (for example: Shenzhen, shengzhen, SZ, Tokyo, and the like), various expression forms of a flight (for example: Flight, NF, and the like), and various expression forms of a train (for example: K386, K1912, 265, and the like). Based on various types of characteristic information saved in the terminal, the extracting module 10 identifies information in the content saved in the terminal, which matches the various types of characteristic information, and determines whether the information meets an extracting rule. If yes, the information is extracted as the trip information. The extracting rule may be one or a combination of more of the following: information including current time, information including time after the current time, information including a location, information including a flight, and information including a train. The current time is system time of the terminal when the extracting module 10 executes the extracting operation.

It should be noted that, after the extracting module 10 extracts the trip information from the content saved in the terminal, the trip information that has been extracted from the content saved in the terminal may be marked, so that when the extracting operation is performed again, the marked content may be ignored. Marking the content that has been extracted can improve the efficiency of the extracting operation.

A saving module 20 saves the trip information extracted by the extracting module 10 in a trip list.

The saving module 20 saves the trip information extracted by the extracting module 10 in the trip list, where the trip list is used to save the extracted trip information. Adopting the trip list to save the extracted trip information can facilitate management on the trip information. It should be understood that, the extracted trip information may not be saved in the trip list, and instead, the extracted trip information may be directly provided for a subsequent module to invoke.

A searching module 30 is configured to select the trip information from the trip list, automatically connect to a preset network address or a preset server address, and search by using part or all of content of each piece of the selected trip information as a key word, so as to obtain assisting information corresponding to the trip information.

The terminal may be preset with some network addresses or server addresses, for example, a website or a server address of a weather information querying site is preset, a website or a server address of an airline company site is preset, or a website or a server address of a train/bus querying site is preset. The searching module 30 selects the trip information from the trip list, uses part or all of content of each piece of the selected trip information as a key word, and automatically connects to the preset network address or the preset server address in the terminal to search, so as to obtain the assisting information corresponding to the selected trip information. Searching based on the preset network address or the preset server address can greatly improve searching speed.

A prompting module 40 is configured to generate prompting information which includes the trip information and the assisting information corresponding to the trip information.

The prompting information generated by the prompting module 40 may adopt a display screen of the terminal to timely display the assisting information to a user, so that the user can conveniently and quickly perform effective query and reference for a trip, or may adopt a sound output device of the terminal to broadcast the assisting information to the user in a sound manner, so that the user can conveniently and quickly perform effective query and reference for the trip.

Figure 6:
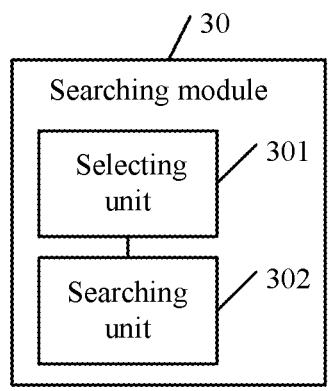
FIG. 6 is a schematic structural diagram of an embodiment of a searching module as shown in FIG. 5.

Refer to FIG. 6, which is a schematic structural diagram of an embodiment of the searching module as shown in FIG. 5, where the searching module 30 includes the following.

A selecting unit 301 is configured to select the trip information from the trip list according to a priority sequence of the trip information in the trip list.

Each piece of the trip information has a corresponding effective searching period, and assisting information obtained within the effective searching period may provide effective travel references for the user. The trip information in the trip list is arranged according to a certain sequence. This sequence may be a default arranging sequence in the trip list, may be an arranging sequence formed after the manual input of the user, may be a time sequence that each piece of the trip information is saved in the trip list, may be a time sequence of the starting point of the effective searching period of each piece of the trip information, and the like. The selecting unit 301 may select the trip information from the trip list according to the priority sequence of the trip information in the trip list.

A searching unit 302 is configured to automatically connect to the preset network address or the preset server address within an effective searching period of each piece of the trip information selected by the selecting unit 301, and search by using part or all of content of each piece of the selected trip information as a key word, so as to obtain the assisting information corresponding to the trip information.

The searching unit 302 may, at a starting time point of the effective searching period of the trip information selected by the selecting unit 301, automatically connect to the preset network address or the preset server address to search for the assisting information corresponding to the trip information.

It should be noted that, the selecting unit 301 may trigger trip information selection according to various types of conditions, for example, trigger according to a searching command sent by the user. If receiving the searching command sent by the user, the selecting unit 301 is triggered by the searching command to immediately select the trip information (the selected trip must be an effective trip, that is, system time when the trip is selected falls within an effective searching period range of the selected trip), and the searching unit 302 automatically connects to the preset network address or the preset server address to search for the assisting information corresponding to the selected trip information. The terminal may also preset a start time point of the searching command, the selecting unit 301 may start the trip information selection when the instructed time point arrives (the selected trip must be an effective trip, that is, system time when the trip is selected falls within the effective searching period range of the selected trip), and the searching unit 302 automatically connects to the preset network address or the preset server address to search for the assisting information corresponding to the selected trip information. Besides, the terminal may also set one or more searching time points for each trip in the terminal, and when the searching time point arrives, the selecting unit 301 uses the trip as the selected trip and the searching unit 302 automatically connects to the preset network address or the preset server address to search for the assisting information corresponding to the selected trip information.

The searching unit 302 searches by using part or all of content of each piece of the selected trip information as a key word, so as to obtain the assisting information corresponding to the trip information, where if the trip information is information including time and a location, the key words may be the time and the location, and the obtained assisting information may include weather information of the location; if the trip information is information including time and a flight, the key words may be the time and the flight, and the obtained assisting information may include one or more of the following: takeoff time of the flight, arriving time of the flight, delay information of the flight, and introduction information of the flight; if the trip information is information including time and a train, the key words may be the time and the train, and the obtained assisting information may include one or more of the following: departure time of the train, arriving time of the train, delay information of the train, and introduction information of the train; if the trip information is information including time, a location, and a flight, the key words may be the time, the location, and the flight, and the obtained assisting information may include one or more of the following: takeoff time of the flight, arriving time of the flight, delay information of the flight, and introduction information of the flight, in combination with weather information of the location; and if the trip information is information including time, a location, and a train, the key words may be the time, the location, and the train, and the obtained assisting information may include one or more of the following: departure time of the train, arriving time of the train, delay information of the train, and introduction information of the train, in combination with the weather information of the location.

Figure 7:
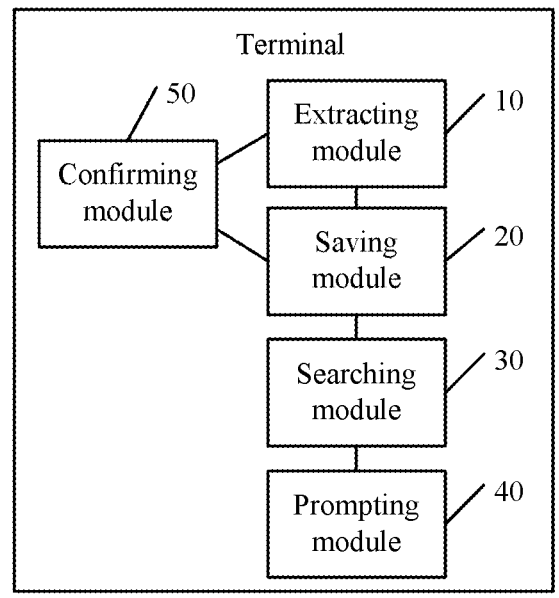
FIG. 7 is a schematic structural diagram of another embodiment of a terminal according to the present invention.

Refer to FIG. 7, which is a schematic structural diagram of another embodiment of a terminal according to the present invention. The terminal includes an extracting module 10, a saving module 20, a searching module 30, and a prompting module 40, and the terminal further includes the following.

A confirming module 50 is configured to provide the trip information extracted by the extracting module 10 for a user to perform a confirmation operation, and when receiving a confirmation message from the user, notify the saving module 20 to execute a saving operation.

The trip information extracted by the extracting module 10 needs the user to confirm the effectiveness thereof. The confirming module 50 provides the trip information for the user to perform the confirmation operation, and the confirming module 50 may provide a man-machine interactive interface (such as a display screen, a touchscreen, and the like) for the user to display the extracted trip information to the user and receive the confirmation operation of the user on the displayed trip information. For a certain piece of trip information, the trip information is effective trip information if a confirmation message from the user is received. If a denial message from the user is received, the trip information is ineffective trip information. If the confirming module 50 receives the confirmation message from the user, it indicates that the trip information corresponding to the confirmation message is effective trip information, and the confirming module 50 notifies the saving module 20 of saving the trip information in the trip list.

Figure 8:
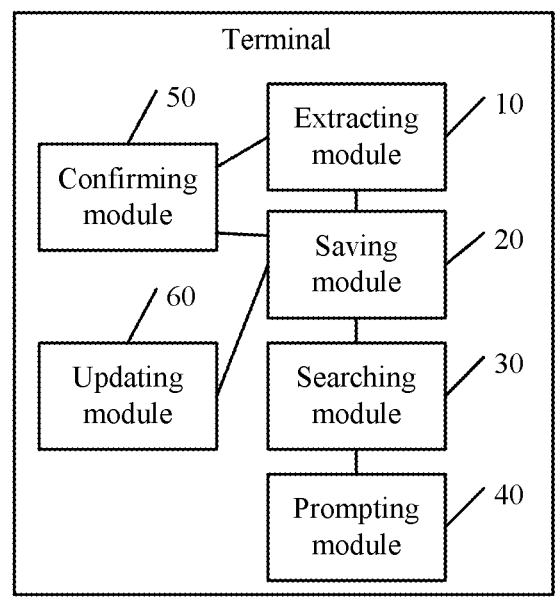
FIG. 8 is a schematic structural diagram of another embodiment of a terminal according to the present invention.

Refer to FIG. 8, which is a schematic structural diagram of another embodiment of a terminal according to the present invention. The terminal includes an extracting module 10, a saving module 20, a searching module 30, a prompting module 40, and a confirming module 50, and the terminal further includes the following.

An updating module 60 is configured to respond to a manual input of the user to update the trip list saved by the saving module 20.

The user may perform manual input on the trip list. The manual input may include: editing the trip information in the trip list, deleting the trip information from the trip list, sequencing the trip information in the trip list according to a priority, creating new trip information in the trip list, and the like, and may further include a confirmation operation on the trip information to be confirmed in the trip list. Reference may be made to FIG. 3 and FIG. 4 for the manual input of the user. The updating module 60 responds to the manual input of the user and updates the trip list according to the manual input of the user.

The terminal according to any one of the embodiments shown in FIG. 5 to FIG. 8 may be a mobile terminal, such as a mobile phone. The mobile phone may further include: a housing, a circuit board, a processor, a touchscreen, a radio frequency circuit, a microphone, a loudspeaker, and a power source, where the touchscreen is mounted on the housing, the circuit board is mounted inside a space enclosed by the housing, and the processor and the radio frequency circuit are disposed on the circuit board; the processor includes all or a part of the foregoing modules; the processor is configured to perform processing on data input through the touchscreen and/or output a processed data result through the touchscreen; the radio frequency circuit is configured to set up communication between the mobile phone and a wireless network, so as to implement data reception and transmission between the mobile phone and the wireless network; the microphone is configured to capture sounds and convert the captured sounds into sound data, so that the mobile phone sends the sound data to the wireless network through the radio frequency circuit; the loudspeaker is configured to restore sounds from the sound data received, through the radio frequency circuit, by the mobile phone from the wireless network and play the sound to the user; and the power source is configured to supply power for all circuits or devices of the mobile phone.

According to the embodiments of the present invention, a terminal extracts trip information from content saved in it, automatically connects to a preset network address or a preset server address, and searches for assisting information corresponding to the trip information by using part or all of content of the trip information as a key word, and generates prompting information to a user. Therefore, the user is capable of conveniently and quickly obtaining firsthand travel assisting information, saving troubles brought by manual participation of the user and therefore solving the problem that an operation is troublesome and time-consuming when the user obtains effective trip-related information by using the terminal.

A person of ordinary skill in the art may understand that, all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Random Access Memory, RAM), or the like.

The foregoing disclosures are merely exemplary embodiments of the present invention, and are not intended to limit the scope of rights of the present invention. A person of ordinary skill in the art may understand that, all or a part of the processes of the foregoing embodiments may be implemented, and any equivalent variation made according to the claims of the present invention still falls within the scope of the present invention.

What is claimed is:

1. A method, comprising:
  receiving, by a mobile terminal, a message via a communication network, wherein the message comprises trip information;
  determining, by the mobile terminal, whether or not to extract the trip information from the message based on whether or not the message meets an extracting rule, wherein the message meets the extracting rule in case that the message comprises a time which is after a current system time of the mobile terminal, and wherein the message does not meet the extracting rule in case that the message does not comprise a time which is after the current system time of the mobile terminal;
  in response to determining to extract the trip information based on the message meeting the extracting rule, extracting, by the mobile terminal, the trip information from the message, wherein the extracted trip information includes the time;
  displaying, by the mobile terminal, the extracted trip information on a display of the mobile terminal;
  based on having extracted the trip information, automatically establishing, by the mobile terminal, a connection to a preset network address or a preset server address; and
  generating, by the mobile terminal, prompting information for a user of the mobile terminal based on assisting information retrieved via the connection to the preset network address or the preset server address.

2. The method of claim 1, further comprising:
  marking, by the mobile terminal, the trip information as having been extracted from the message.

3. The method of claim 1, further comprising:
  adding, by the mobile terminal, the extracted trip information to a trip list.

4. The method of claim 1, further comprising:
  obtaining weather information related to the trip information.

5. The method of claim 3, further comprising:
  updating the trip list based upon information obtained from a server.

6. The method of claim 3, further comprising:
  editing, deleting and/or creating information in the trip list based on received user input.

7. The method of claim 3, wherein trip information in the trip list is arranged according to a certain sequence.

8. The method of claim 1, wherein the mobile terminal is a cellular phone.

9. The method of claim 1, wherein the assisting information comprises at least one of: weather information, takeoff time of a flight, introduction information of a flight, arriving time of a flight, delay information of a flight, departure time of a train, arriving time of a train, introduction information of a train, or delay information of a train.

10. The method of claim 1, further comprising:
  receiving, by the mobile terminal, a confirmation input from a user of the mobile terminal; and
  in response to receiving the confirmation input, saving, by the mobile terminal, the extracted trip information in a trip list.

11. A mobile terminal, comprising:
  a processor;
  a non-transitory computer-readable medium having processor-executable instructions stored thereon; and
  a display;
  wherein the processor is configured to execute the processor-executable instructions to carry out the following on the mobile terminal:
  receiving a message via a communication network, wherein the message comprises trip information;
  determining whether or not to extract the trip information from the message based on whether or not the message meets an extracting rule, wherein the message meets the extracting rule in case that the message comprises a time which is after a current system time of the mobile terminal, and wherein the message does not meet the extracting rule in case that the message does not comprise a time which is after the current system time of the mobile terminal;
  in response to determining to extract the trip information based on the message meeting the extracting rule, extracting the trip information from the message, wherein the extracted trip information includes the time;

displaying the extracted trip information on a display of the mobile terminal;

based on having extracted the trip information, automatically establishing a connection to a preset network address or a preset server address; and generating prompting information for a user of the mobile terminal based on assisting information retrieved via the connection to the preset network address or the preset server address.

12. The mobile terminal of claim 11, wherein the processor is further configured to execute the processor-executable instructions to carry out the following on the mobile terminal:

adding the extracted trip information to a trip list.

13. The mobile terminal of claim 12, wherein the processor is further configured to execute the processor-executable instructions to carry out the following on the mobile terminal:

editing, deleting and/or creating information in the trip list based on received user input.

14. The mobile terminal of claim 12, wherein trip information in the trip list is arranged according to a certain sequence.

15. A non-transitory computer-readable medium having processor-executable instructions stored thereon, wherein the processor-executable instructions, when executed, facilitate:

receiving, by a mobile terminal, a message via a communication network, wherein the message comprises trip information;

determining, by the mobile terminal, whether or not to extract the trip information from the message based on whether or not the message meets an extracting rule, wherein the message meets the extracting rule in case that the message comprises a time which is after a current system time of the mobile terminal, and wherein the message does not meet the extracting rule in case that the message does not comprise a time which is after the current system time of the mobile terminal;

in response to determining to extract the trip information based on the message meeting the extracting rule, extracting, by the mobile terminal, the trip information from the message, wherein the extracted trip information includes the time;

displaying, by the mobile terminal, the extracted trip information on a display of the mobile terminal;

based on having extracted the trip information, automatically establishing, by the mobile terminal, a connection to a preset network address or a preset server address; and generating, by the mobile terminal, prompting information for a user of the mobile terminal based on assisting information retrieved via the connection to the preset network address or the preset server address.

* * * * *